No. 853,613. PATENTED MAY 14, 1907.
G. R. WYMAN.
PAPER BOX MACHINE.
APPLICATION FILED JAN. 30, 1905.
5 SHEETS—SHEET 4.
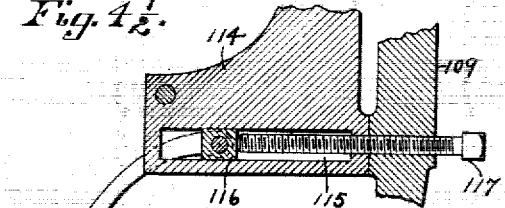
Fig. 4½.
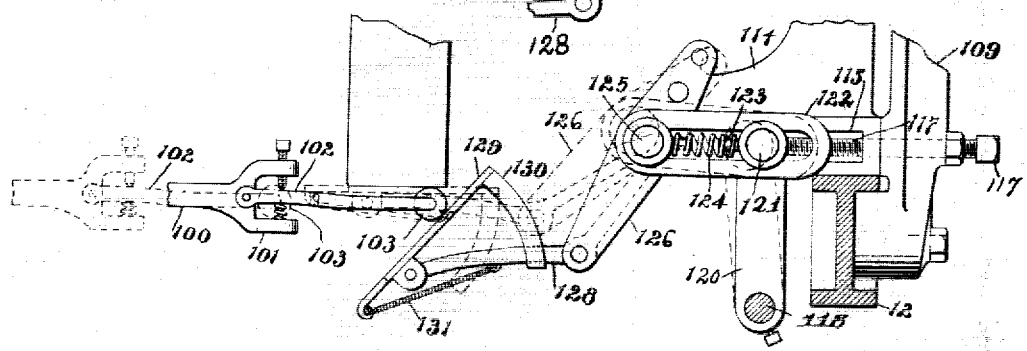
Fig. 4.
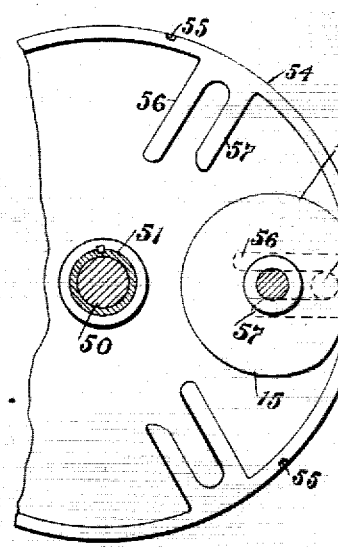
Fig. 5.
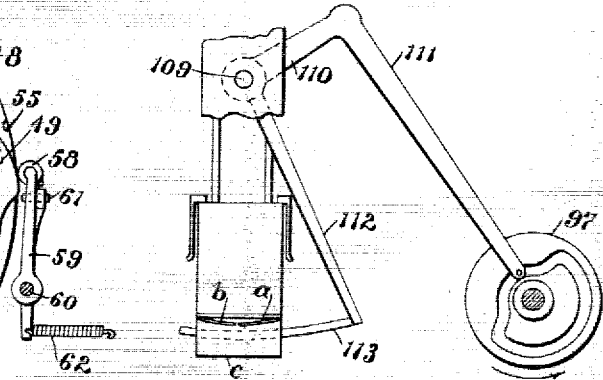
Fig. 6.
Witnesses:
Walter N. Naylor
Raphael G. Blanc
Inventor:
George R. Wyman
By Henry J. Miller
Atty.

No. 853,613. PATENTED MAY 14, 1907.
G. R. WYMAN.
PAPER BOX MACHINE.
APPLICATION FILED JAN. 30, 1905.
5 SHEETS—SHEET 5.
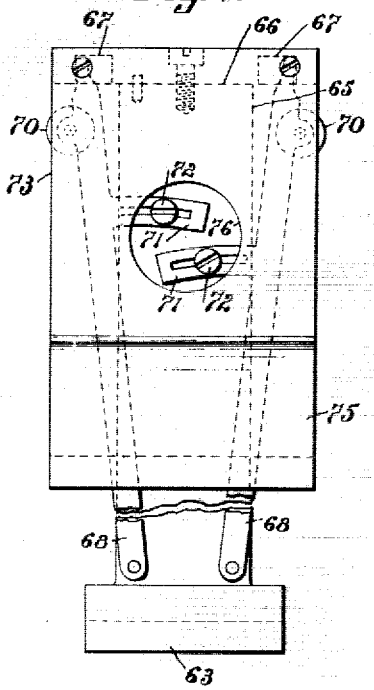
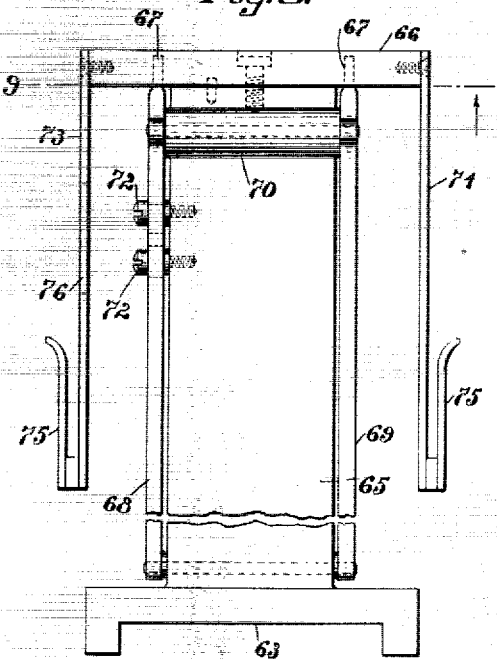
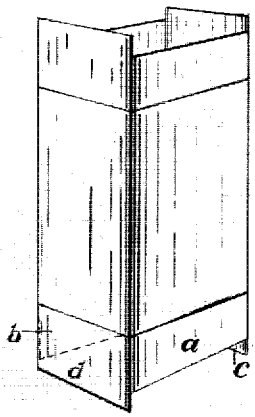
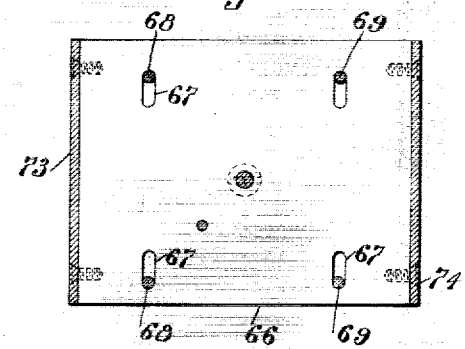
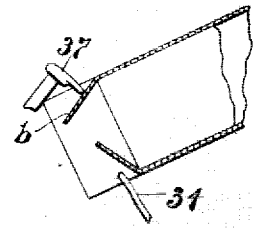
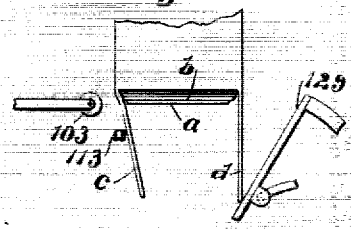
Witnesses:
Walter H. Naylor
Raphael G. Blanc
Inventor:
George R. Wyman
By Henry J. Miller
atty.

UNITED STATES PATENT OFFICE.

GEORGE R. WYMAN, OF EAST WALPOLE, MASSACHUSETTS, ASSIGNOR TO F. W. BIRD & SON, OF EAST WALPOLE, MASSACHUSETTS, A FIRM.

PAPER-BOX MACHINE.

No. 853,613.

Specification of Letters Patent.

Patented May 14, 1907.

Application filed January 30, 1905. Serial No. 243,179.

*To all whom it may concern:*

Be it known that I, GEORGE R. WYMAN, of East Walpole, in the county of Norfolk and State of Massachusetts, have invented certain new and useful Improvements in Paper-Box Machines; and I hereby declare that the following is a full, clear, and exact description of the same, reference being had to the accompanying drawings, forming part of this specification.

This invention refers to improvements in paper box machines and relates particularly to improvements in such machines whereby the end portions of the box are turned inward and sealed.

One object of this invention is to more accurately close the end portions, or flaps, of the box and particularly the last flap, so that the latter will not be distorted in said closing operation.

Another object of the invention is to more positively compress the flaps together to seal the same.

Another object of the invention is to improve the means for turning in and holding the first pair of flaps by suitably positioning the third flap.

Other objects of the invention will appear from the following description.

The invention consists in a movable box blank-carrier, a series of flap turning guides, and flap pressing mechanism adapted to act on the last flap while the carrier is stationary.

The invention also consists in the peculiar box-blank carrier and in the means for controlling the movement thereof.

The invention also consists in the peculiar construction of the box blank holder, and in the means for adjusting the same.

The invention also consists in the means for turning inward and holding the third flap.

The invention also consists in the construction of the fourth flap folder.

The invention also consists in such other novel features of construction and combination of parts as shall hereinafter be more fully described and pointed out in the claims.

Figure 1:
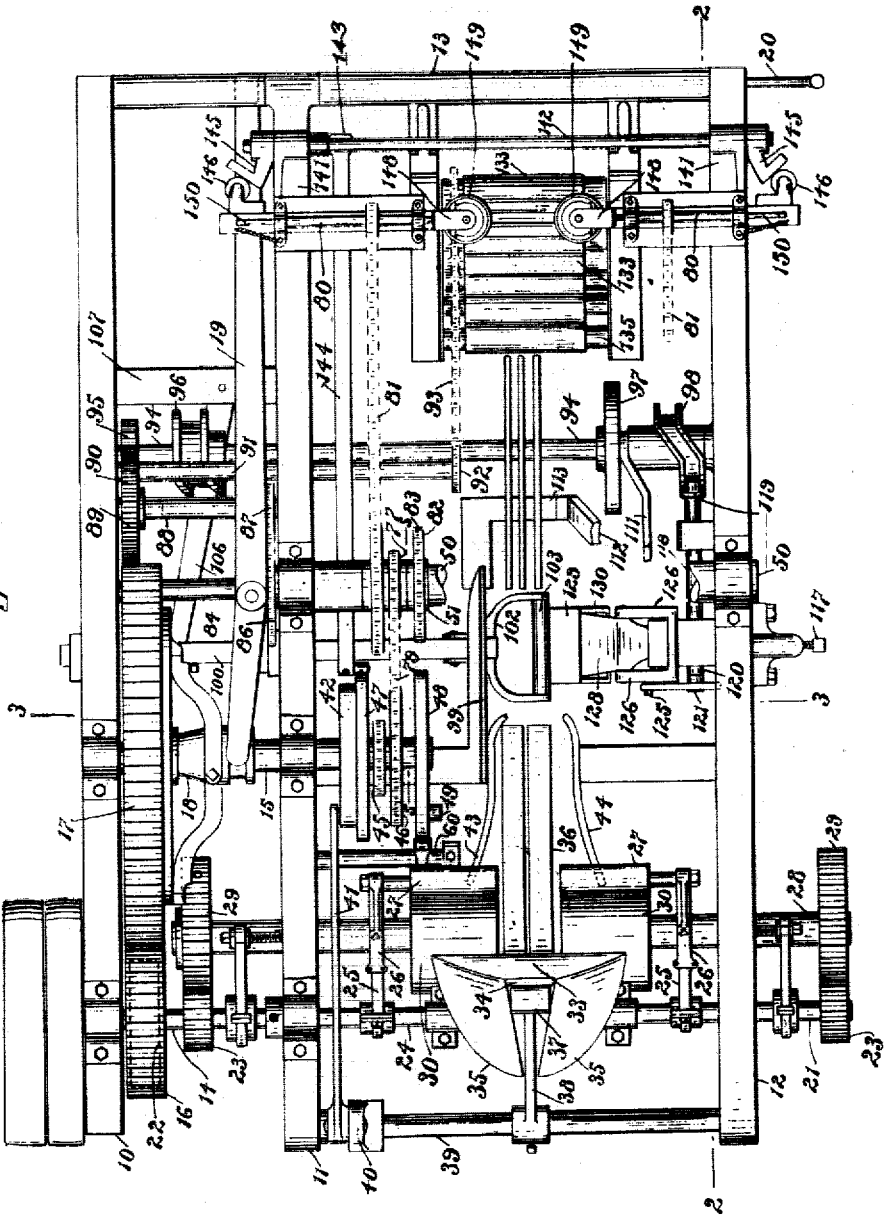
Figure 2:
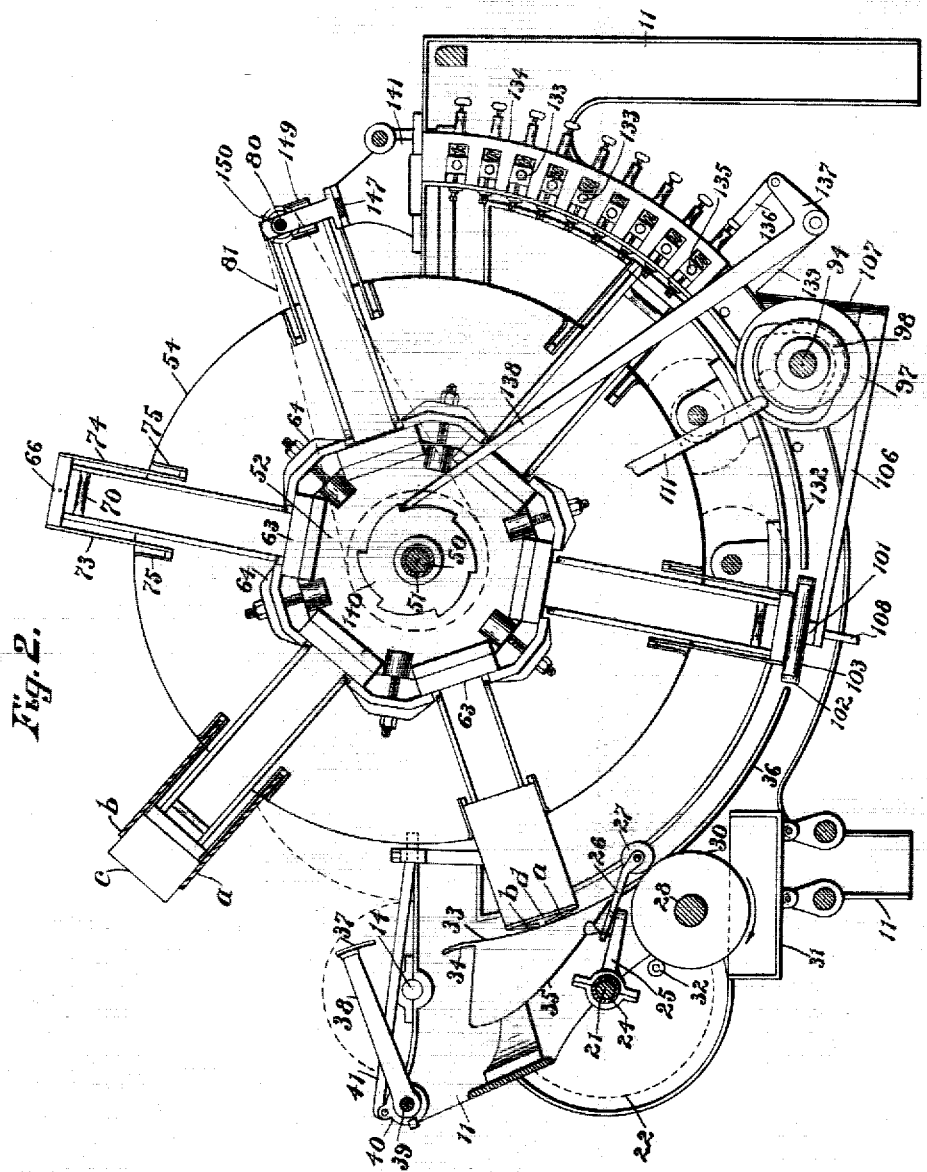
Figure 3:
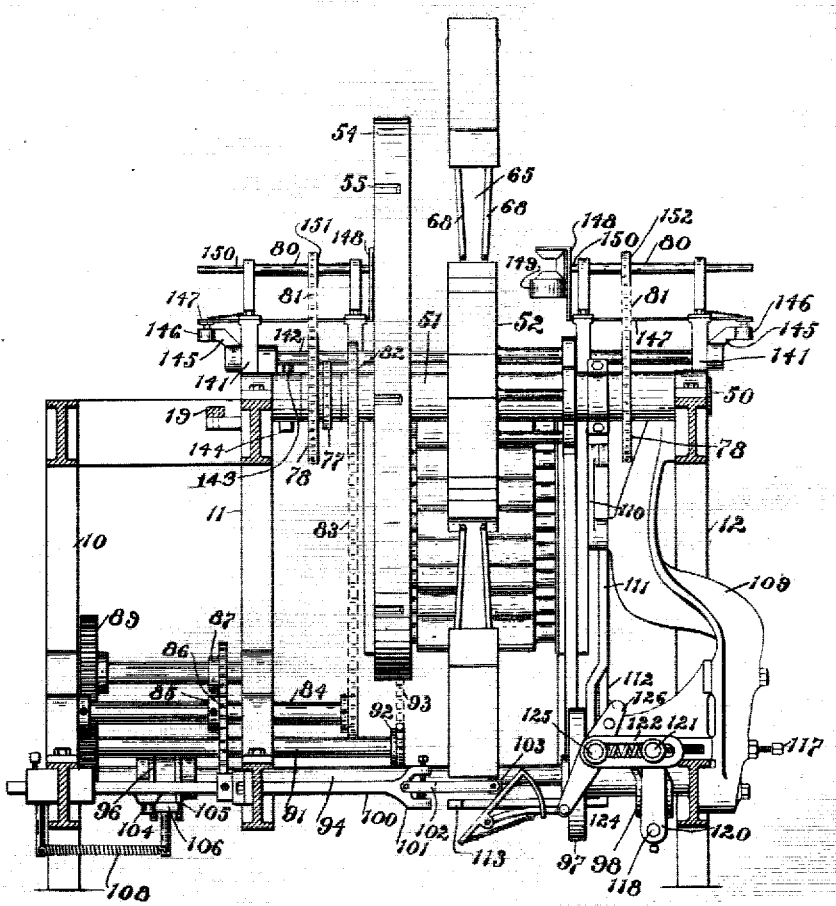

Figure 1, represents a plan view of the improved paper box machine, parts of the same being broken away. Fig. 2, represents a sectional view of the same taken on line 2—2 Fig. 1. Fig. 3, represents a cross sectional view of the machine taken on line 3—3 Fig. 1. Fig. 4, represents an enlarged view of the side flap folders taken on the same line as Fig. 3. Fig. 4½, represents a similar view showing further details of construction. Fig. 5, represents a detail view of the means for periodically advancing the carriers, taken on line 5—5, Fig. 1, some of the parts being omitted. Fig. 6, represents details of the third flap holder and its actuating mechanism. Fig. 7, represents an end elevation of one of the carton carriers removed from the machine. Fig. 8, represents a side view of the same. Fig. 9, represents a cross sectional view taken on line 9—9 Fig. 8. Fig. 10, represents a perspective view of a box, or carton, the bottom flaps of which are designed to be closed and sealed by this machine. Fig. 11, is a side elevation of the same illustrating the turning inward of the first end flap *a* and the tucking inward of the second end flap *b*. Fig. 12, represents a view taken at right angles to Fig. 11 showing the third flap *c* held in position to prevent the springing outward of flaps *a* and *b*, also showing the means for closing the third and fourth flaps.

Similar numbers of reference designate corresponding parts throughout.

The present invention more particularly relates to improvements in that class of paper box machines illustrated in patent to Lewis F. Fales, No. 503,907, dated August 22, 1893; being designed primarily for the closing of the end portions, flaps, of a tubular blank to form a rectangular shaped box, known as a carton, the general structure of which will be understood by reference to Fig. 10.

The drawings illustrate the machine, and some of its parts in the preferred form, in which 10, 11 and 12 are the main frames which are connected together by the stay 13 and by other suitable strengthening members. In the frames 10 and 11 are journaled the drive shaft 14 and the main shaft 15; the drive shaft is driven by a belt working over its drive pulley, in the usual manner, and is furnished with the gear 16 which meshes with the gear 17 loose on the shaft 15 and adapted to be connected therewith by the clutch mechanism 18 controlled by the lever 19 pivotally supported on a bracket extending from the frame 11, see Fig. 3, and operated by the hand rod 20 mounted in the frames 11 and 12 beneath the stay 13, see Fig. 1.

Journaled in the frames 10, 11 and 12 beneath the shaft 14 is the glue roll drive shaft 21 which is driven by the gear 22, indicated in dotted lines in Fig. 1, meshing with the gear 16; this shaft 21 having the gears 23—23 and being furnished with the sleeve 24 which extends between the frames 11 and 12 and carries the arms 25—25 on which are adjustably mounted the frames 26—26 of the side flap press rolls 27—27. Also journaled in the frames 11 and 12 is the glue roll shaft 28 having the gears 29—29 meshing with the gears 23—23 and furnished with the glue roll sections 30—30 spaced a suitable distance apart on said shaft. The peripheral portions of these glue roll sections work through the tank 31 supported between the frames 11 and 12; the usual provision being made by the use of the roll 32, supported in any ordinary manner, for distributing the glue or other adhesive contained in said tank evenly over the periphery of said glue roll sections.

Between the frames 11 and 12, above the shaft 21 is the plate 33 having the upwardly extending end 34, the lateral backwardly extending wings 35—35 and the curved guide 36, the end 34 being designed to turn inward one of the end flaps of a carton moved thereover while the wings 35—35 are shaped to effect the spreading outward of the side flaps of said carton so that these side flaps may pass between the press rolls 27—27 and the related glue roll sections 30—30 and receive a thin coating of glue, or other adhesive on their inner surfaces. Provision is also made at this portion of the machine for tucking inward the remaining end flap of the carton before it reaches the part 34 of the plate 33; this being effected by the tucker 37 carried on the arm 38 which is fixed on the shaft 39 journaled in the frames 11 and 12 and having the lever 40 adapted to be periodically operated, by the rod 41 connected with said lever and having a stud which works in the groove of the cam 42 on the shaft 15, whereby the tucker 37 is periodically moved suddenly toward the end 34 of the plate 33.

Supported respectively from extensions from the frames 11 and 12 are the side flap guides 43 and 44 which engage the side flaps of the carton as said flaps pass, in horizontal extension, from the respective glue roll sections and turn said side flaps downward until they are approximately in line with the sides of the carton.

Returning now to the shaft 15, it will be seen, Figs. 1 and 3, that said shaft is furnished, in addition to the cam 42, with the sprockets 45 and 46 and with the cams 47 and 48, the latter having the projection 49, by the action of which the carton carrier is designed to be periodically actuated. Rotatable on the shaft 50 is the sleeve 51 on which is mounted the carrier member 52, Figs. 2 and 3, to which a series of radially extending carriers, hereinafter more fully described, are, preferably, removably secured. On said sleeve is also mounted the disk 54 having in its periphery a series of notches 55—55 and furnished on its outer face with radially extending ways formed by the walls 56 and 57, see Fig. 5, so arranged with reference to the path of movement of the projection 49 of the cam 48 that, when said cam is caused to rotate, this projection 49 will work into said ways in succession and effect the periodical rotation of said disk and of the carrier member mounted to rotate therewith.

The peripheral shape of the cam 48 is shown in Fig. 5 of the drawings and against this periphery works the bearing 58 of the arm 59 which is mounted to swing on the stud 60 extending from the frame 11 and is furnished with the locking pin 61 adapted to enter any one of the notches 55 brought into registration therewith when permitted to move inward under the action of the spring 62, secured to the lower end of the arm 59 and to a fixed part of the machine.

The carton carriers are illustrated in detail in Figs. 2, 7, 8 and 9, each comprising a base 63, designed to be, preferably, removably secured to the central carrier member 52 by means of clamps 64—64; from the base 63 extends the pedestal 65 to the upper end of which is removably secured the block 66, designed to resist the pressure of the flap sealing devices, in the under sides of these blocks 66—66 are formed sockets 67—67 adapted to act as gaging devices for the upper ends of the rods 68—69—68—69 which rods are pivotally mounted in pairs on the pedestals 65 and carry rolls 70—70, the outward movement of the free ends of said rods being limited by the walls of the sockets 67—67 to locate peripheral portions of rolls 70—70 slightly beyond the edges of the block 66 to facilitate the removal of the cartons from said block. As I have shown the sockets 67—67 as having lateral dimensions greater than the diameter of the free ends of the rods, I provide the rods 68—68 with securing members 71—71 having slots through which the clamping screws 72—72 extend, these screws being screwed into the pedestal 65 to clamp the rods 68—68 in the adjusted position. Where, however, the sockets 67 are formed to fit closely over the ends of the rods 68—69 no securing device is required. The blocks 66 may be secured to the pedestals 65 in any usual manner and to the edges of these blocks are fastened the side plates 73 and 74 having the upturned lips 75—75, the plates 73 having openings 76 through which a tool may be entered to loosen or tighten the screws 72—72.

On the shaft 50 are mounted sprocket wheels as 77 and 78, Fig. 1, the sprocket 77 being driven from the sprocket 46 on the shaft 15 by means of the chain 79 while power is transmitted from the sprockets as 78 to sprockets on the sleeves 80—80 of the carton ejecting means by the chains 81—81.

Mounted on the sleeve 51 of the shaft 50 is the sprocket wheel 82 carrying the chain 83 which drives the sprocket on the shaft 84 journaled in the frames 10 and 11 at the lower part of the machine, this shaft 84 has a large sprocket 85 which is connected by the chain 86 with the sprocket 87 on the rotatable shaft 88, see Figs. 1 and 3, having the gear 89 which meshes with the gear 90 on the shaft 91, to drive this shaft 91 and its sprocket 92 to operate the gang of presser rolls through the medium of the drive chain 93, as shall hereinafter be described.

The cam shaft 94 extends across the machine and is journaled in bearings of the frames 10, 11 and 12, motion being imparted to this shaft 94 by its gear 95 meshing with the gear 90 to effect the rotation of this shaft and its cams 96, 97 and 98, the cams 96 and 98 being designed to actuate the respective mechanisms for folding inward the side flaps of the carton, while the cam 97 effects the movement of the third flap holding device to move the same out of the path of the third folder prior to the folding movement of said folder.

Extending from the guide 43 to and beyond the point at which the final closing of the flaps is effected is the straight guide 99 Fig. 1, and beneath this guide the rod 100 is mounted to slide in guides with which the lower parts of the frames 10 and 11 are furnished, this rod 100 has the frame 101 in which the third folder frame 102 furnished with the roll 103 is adjustably mounted and yieldingly supported; the rod 100 is also provided with depending projections 104 and 105 between which the lever 106 is engaged, this lever being pivotally mounted on the brace 107 and having a projecting bearing engaged in the groove of the cam 96 while the free end of this lever is connected with the frame 10 by the spring 108. The cam 96 is designed to actuate the rod 100, through the medium of the lever 106, to move the roll 103 across the path of the third flap of the carton soon after the carton is brought opposite said folder.

Mounted on the frame 12 is the frame 109 on which is pivoted the arm 110 of the lever 111, see Fig. 6, which latter arm extends downward and has a projecting bearing working in the groove of the cam 97, while from the pivoted portion of the arm 110 extends the member 112 carrying the third flap holder 113. In Fig. 6 of the drawings these parts are shown approximately in the positions they are designed to be at the time the carton is brought to the position for folding inward the side flaps, the third flap c being bent slightly inward to bear on the side edges of the end flaps a and b to hold said end flaps from springing outward for, as will be seen by reference to Fig. 2, at this time the carton has been moved beyond the end of the plate 36 and the flaps a and b would otherwise be unsupported.

The action of the cam 97 on the holder 113, through its connections therewith, is such that this holder is swung out of the position for holding the third flap between the time at which the third flap is folded against the flaps a and b and the folding inward of the fourth flap whereby said holder 113 is moved out of the way of the free edge of the fourth flap.

At the lower part of the frame 109, which is located opposite the point at which the third and fourth flaps are folded, is the inwardly projecting member 114 having the slot 115 in which the block 116 is free to move toward and from the set screw 117. Journaled in bearings extending from the frame 12 is the shaft 118 having the crank 119 which is furnished with a bearing working in the groove of the cam 98; on this shaft 118 is fixed the arm 120 having the stud 121 which extends through the slot in the link 122 and has the pin 123 carrying one end of the spring 124 the other end of which is engaged on the pin of the stud 125 which stud extends from the frame 126 pivotally mounted on the member 114.

Pivotally mounted between the arms of the frame 126 is the folder support the upper end of which is pivoted to the block 116 and to the outer end of such support is pivoted the fourth folder plate 129, the upper end of this folder having the stop members 130—130 the ends of which are bent under the folder support to act as stops to limit the upward movement of this end of the plate 129 under the action of the spring 131 attached to the lower end of the plate 129 and to the support 128.

When the arm 119 is swung inward by its shaft toward the position indicated in dotted lines in Fig. 4, the spring 124 is compressed until the frame 126 is suddenly forced outward on its pivots by the action of the spring on the stud 125. This movement is effected during the backward movement of the third folder 103, the fourth folder plate 129 being thus carried toward the carton until the upper part of said plate strikes the side of the carton when the continued movement of the lower part of said plate will effect the rocking of said plate on the corner of the carton and the forcible folding inward and upward of the fourth flap and the impact on the same of the plate 129 to compress the glued inner surface of the fourth flap against the outer surface of the third flap.

The time during which the pressure of the plate 129 is exerted against the fourth flap, to compress all of the flaps between the same and the block 66 of the carton carrier depends upon the length of dwell in the cam 98 and may be more or less; it is evident, however, that the plate 129 should be retracted from contact with the fourth flap before the carton is again moved forward, thus preventing the distortion of the fourth flap by dragging the same along in contact with the folder plate.

As the carton is carried along from the folding position, it passes over the guides 132 which tend to support the fourth flap against the third flap until the glue therebetween is partially set, the closed end of the carton is then carried forward over a series of pressure rolls 133 which are journaled in yielding bearings of curved frames 134—134 in the machine and are driven by means of the sprocket chain 93, Fig. 1. The bearings of the first roll 135 of said series 133 are connected with the rod 136 which is pivotally connected with the short arm 137 of the lever 138, this lever being pivoted on the member 139 extending from the frame 11, and the free end of said lever extending upward and bearing on the cam 140 on the sleeve 51 and so shaped that as a carton carrier approaches said first roll 135 the lever 138 is forced outward to effect the drawing outward of the bearings of said roll 135 sufficiently to permit the free movement of the end of the carton over said roll, the sharp return of the cam 140 then permitting the return movement of the lever 138 to press said roll 135 against the fourth flap of the carton whereby the closed end of the carton may be more readily carried into contact with the rolls 133.

Mounted on the frames 11 and 12 are the brackets 141—141 in which is journaled the rock shaft 142 having a depending arm 143 to which is pivoted the rod 144 which extends inward and has a roller bearing working against the edge of the cam 47 on the shaft 15, the action of said cam on this rod 144 being timed to effect the rocking of the shaft 142 as a carton is carried over the rolls 133 to swing the cam members 145—145, on the end portions of said shaft against the associated rolls 146—146.

The rolls 146—146 are carried by rods 147—147 which are mounted to slide laterally in guides of the brackets 141—141 and having at their inner ends frames 148—148 in which are rotatably mounted the friction rolls 149—149 driven by any usual bevel gears from the shafts 150—150, which shafts are free to reciprocate in the sleeves 80—80 journaled in extensions of the brackets 141—141 while rotating with said sleeves, such rotation being effected by the chains 81—81 working over the sprockets on said sleeves.

When the clutch 18 is shipped to engage with the complemental clutch member of the gear 17, to connect said gear with the shaft 15, said shaft is caused to rotate with such gear and the mechanism in connection with the shaft is driven. As the cam 48 rotates, its stud 49 is swung into one of the guide ways, formed by the walls 56 and 57, on the side of the disk 54 and, while working outward and inward in said guide way, effects the partial rotation of such disk 54 and of the carton carrier base 52, mounted to move with said disk, to advance the carton carriers, extending radially from said base, and the cartons placed on said carriers through the flap turning and sealing devices by a series of step by step or periodical movements of the cartons, between which movements there is a series of dwells in the forward movement of the cartons from the time the stud 49 leaves one of said guide ways until it engages the next succeeding guide way.

As the carton is carried forward, by the carrier, the first end flap $a$ is brought to bear against the part 34 of the plate 33 and is turned inward, as is shown in Figs. 2 and 11, while, before the carton is moved wholly by the end of said part 34, the tucker 37 is actuated by the cam 42 and the connections therewith to tuck inward the second end flap $b$ so that these flaps can be carried forward over the plate 33 in the positions shown in Fig. 2. In this forward movement of the carton the side flaps $c$ and $d$ are spread outward by the wings 35—35 of the plate 33 until they are approximately at right angles with the body of the carton and a dwell in the movement of the carton carrier is had approximately at this time. During the next forward movement of the carton carrier the side flaps are carried over the peripheries of the respective glue roll sections 30—30, being thus supplied with adhesive on their under, or inner surfaces, and the carton is brought to a rest opposite the folding devices for the third and fourth flaps. In the passage to this position the ends flaps $a$ and $b$ are sustained in the positions shown in Fig. 2 while the side flaps in traveling under the guides 43—44 are turned downward, the flap $c$ being bent inward beyond the line of its carton side by the inturned end of the guide 43 to the position shown in Figs. 6 and 12, to hold the free ends of the flaps $a$ and $b$ from springing downward, this position of the flap $c$ being maintained by the plate 113 after this flap $c$ is moved past the end of the guide 43.

Approximately as the flap $c$ moves past the end of the guide 43 it bears against the side of the holder 113, previously swung to this position, and is held by such holder in the inclined position against the edges of the flaps $a$ and $b$ until the third flap folder moves inward and folds said flap $c$ against the flaps $a$ and $b$; the holder 113 being then moved backward before the fourth flap $d$ is swung inward and upward. At this time the shaft 94 and its cam 96 has been so rotated, by the mechanism heretofore described, that the lever 106 is swung to move inward the rod 101 thereby carrying inward the roll 103, as shown in full lines in Fig. 4, to turn inward the flap c on to the flaps a and b and to roll said flap c into intimate contact with said flaps a and b, whereby the adhesive surface of the flap c is secured to the outer surfaces of the flaps a and b.

When the third folder roll 103 begins its backward movement, from the position shown in full lines in Fig. 4 the cam 98, on the shaft 94, effects the actuation of the crank 119 to rock the shaft 118 whereby the lever 120 is swung inward to move the stud 121 and to effect the compression of the spring 124 until the expansive strain of said spring is sufficient to overcome the inertia of the frame 126 and the mechanism carried thereby when the lower portion of said frame will be suddenly swung inward, and the fourth folder plate 129 being also carried inward with a rocking movement over the lower edge of the carton will turn inward the fourth flap d and compress the glued surface of the same against the outer surface of the flap c with a sharp blow which tends to compress all of the flaps, between said plate 129 and the carton carrier block 66, and to set the glue or other adhesive.

During the action of the third and fourth folders the disk 54 is locked against rotation by means of the locking pin 61 entering one of the notches 55, thereby preventing the movement of the carton carriers during such folding operation. As the last flap is folded, and the plate 129 is retracted, the cam 48 works against the roll 58 of the arm 59 to swing said arm outward and to release its pin 61 from its engagement with the associated notch 55, to permit the further rotation of the disk 54 and the carton carriers.

The advance movement of the carton carrier from the position for folding the third and fourth flaps carries the, now closed, end of the carton over the curved plate 132 and over the roll 135, which has been moved outward as above described and which is now moved inward to press against the end of the carton, this end of the carton being carried over the series of rolls 133, which tend to compress the flaps together, and the carton being finally carried between the rolls 149 while said rolls and their shafts are approximately at the outer limit of their movement under the action of the cams 145 and the associated mechanism.

The rolls 149—149 are constantly driven through their connections with the sprockets as 46 and as the cartons are successively carried between said rolls the cam 47 moves the rod 144 forward to rock the shaft 142 and to swing the cams 145 away from the rolls 146 thereby permitting inward movement of the mechanism in connection therewith under the action of their springs, and effecting the pressing of the rolls 149 against the sides of the cartons whereby the carton sides are nipped between the rolls 149 and those marked 70, of the carton carrier, and the carton is moved lengthwise off of the carrier.

It is evident that the fourth folder plate may have more or less dwell against the fourth flap after folding the same, or the actuating devices may be adjusted to permit this plate to fall back slightly after delivering its impact blow on the fourth flap. By this means, if the fourth flap d does not adhere to the third flap c, the plate 129 affords a support for the fourth flap in the next period of movement of the box, sustaining said fourth flap in position when it may pass on to the wires 132.

It is not my intention to limit this invention to the specific constructions herein shown as I am aware that various modifications of the same may be made without departing from the spirit of this invention.

Having thus described my invention I claim as new and desire to secure by Letters Patent.

1. A paper box machine comprising a revoluble carrier upon which a tubular blank may be placed with flaps extending beyond the end of the carrier, means over which the end of the blank is carried to spread the side flaps, glue applying means, and side flap folding means movable toward and from the path of said carrier.

2. A paper box machine comprising a revoluble carrier having a radial arm upon which a tubular blank may be placed with side flaps extending beyond the end of the carrier, means for supplying glue to said flaps, and flap folding means movable across the path in which said flaps are carried forward.

3. A paper box machine comprising a revoluble carrier upon which a tubular blank may be placed with its flaps extending beyond the end of said carrier, fixed means for turning inward one of the end flaps of said blank and for spreading the side flaps thereof, glue applying means, means for turning the side flaps approximately in line with the sides of the blank, and side flap folding devices adapted to work across the path in which said side flaps are carried forward.

4. A paper box machine comprising a movable carrier, means for periodically moving said carrier, flap turning and flap spreading means past which said carrier is moved during one of said periods of movements, glue applying means past which said carrier is moved in a succeeding period of movement, and flap folding devices between which the carrier is brought to a rest at the completion of the movement past the glue applying means.

5. A paper box machine comprising a movable carrier for tubular blanks, means for periodically moving the same, mechanical elements operating to fold inward the end flaps of said blank during one of said periods of movement, and means for subsequently folding inward one of the side flaps of said blank when the carrier is at rest.

6. A paper box machine comprising a movable carrier for tubular blanks, means for periodically moving the same, end flap folding mechanism adapted to operate on said flaps during one period of movement, glue applying means and flap straightening means adapted to act on the side flaps during a subsequent period of movement, and a side flap holding means for engaging one of said side flaps as the movement from the gluing mechanism is completed.

7. A paper box machine comprising a movable carrier for tubular blanks, means for periodically moving the carrier, mechanical elements acting to fold inward the end flaps of said blank during its forward movement and for spreading the side flaps, glue applying means, located beyond the limit of said movement, past which the carrier is moved during a subsequent period, and side flap folding means located adjacent to the limit of movement from the glue applying means.

8. A paper box machine comprising a movable carrier for tubular blanks, means for periodically moving the same, end flap folding elements, and glue applying mechanism past which said carrier is adapted to move in successive periods and side flap folding devices adapted to be actuated while the carrier is at rest.

9. A paper box machine comprising end flap closing means, glue applying means, side flap folding means, and means for feeding forward a box, having flaps to be closed, by a series of periodical movements past the end flap closing means and the glue applying means and supporting the same at rest opposite the side flap closing means.

10. A paper box machine comprising a rotatable base, a series of radially extending carriers mounted thereon and adapted to receive tubular box blanks having flaps extending beyond the ends of said carriers, means for periodically moving said base, and independent means for locking the same against movement at times.

11. A paper box machine comprising a rotatable box blank carrier, a driven member mounted to rotate therewith, a drive shaft, a drive member mounted thereon and adapted to engage and disengage the driven member, and means independent of the drive member for locking the driven member from movement during the disengagement of the driving member.

12. A paper box machine comprising a rotatable box blank carrier provided with a member adapted to be periodically driven, a drive shaft, means on said shaft for periodically engaging and driving the driven member, and independent means controlled by the engaging member for locking the driven member from movement at times.

13. A paper box machine comprising means for turning inward the end flaps of a box blank, means for partially turning inward one of the side flaps to hold said end flaps in position, a holder, independent of said side flap turning means, for holding said side flap in said position, and a flap holder independent of said holding means.

14. A paper box machine comprising means for turning inward the end flaps of a carton, means for partially turning inward one of the side flaps to hold the end flaps in position, a holder for holding said side flap in position, means for moving the holder, and a flap folder movable in a path at an angle with the path in which said holder moves.

15. A paper box machine comprising means for feeding forward a box blank having flaps to be closed, mechanical elements acting to turn inward the end flaps thereof, means for applying glue to the side flaps, means for turning inward one of said side flaps to hold the end flaps in position, means mounted to move at the side of the path of the box for holding said side flap in position, and a flap folder mounted to move across said path.

16. A paper box machine comprising a rotatable carrier having radially extending arms on which tubular blanks may be placed with their flaps extending beyond the ends of said arms, means for rotating the carrier, means for folding inward the end flaps of the box blank, means for applying glue to the side flaps, and means for rolling one of the side flaps down onto the end flaps.

17. A paper box machine comprising a rotatable carrier having radially extending arms on which tubular blanks may be placed with their flaps extending beyond the ends of the arms, means for periodically rotating said carrier, mechanical elements acting to fold inward the end flaps, means for applying glue to the side flaps, and a roller yieldingly mounted to work across the path of the box to roll one of the side flaps down on to the end flaps.

18. A paper box machine comprising a rotatable carrier having radially extending arms on which tubular box blanks may be placed with their flaps extending beyond the ends of the arms, means for rotating the carrier, means for turning inward the end flaps, means for applying glue to the side flaps and means for turning inward one of the side flaps and subjecting the same to an impact pressure.

19. A paper box machine comprising a form on which a tubular box blank may be placed with its flaps extending beyond the end of the arm, means for turning inward the end flaps, means for applying glue to the side flaps, means for folding inward one of the side flaps, and means for folding inward the last flap and compressing all of the flaps against the end of the form.

20. A paper box machine comprising a form having a rigid end on which a box blank may be placed with its flaps extending beyond the end of the form, and a folder plate movable toward said form and mounted to rock over the edge of said form, or the blank mounted thereon, and means adapted to move said plate toward the end of said form with an impact pressure.

21. Flap folding means for a paper box machine comprising a pivoted lever, means for suddenly actuating said lever, a folding plate pivoted at a point intermediate its ends to said lever, and a spring secured to said plate and to the lever.

22. Flap folding means for paper box machines comprising a guide, a block movable in the guide, adjustable means for limiting the movement of the block, a lever pivoted to the block, a folder plate pivotally mounted on said lever, a second lever pivotally mounted and pivoted to said lever, and means for exerting a pressure against said second lever to swing the same.

23. Flap folding means for paper box machines comprising a member movably mounted, a lever pivoted to said member, a folder plate pivoted intermediate its ends to said lever and having one end connected therewith by a spring, a second lever pivotally mounted and pivoted to the first mentioned lever a spring carried between a portion of the second member and a compression member, such compression member, and means for moving the compression member to compress the spring.

24. A paper box machine comprising a carrier rotatably mounted, means for periodically rotating said carrier, side flap folders, a shaft, connections between the shaft and said folders, for operating them, and connections between said shaft and the carrier whereby the shaft is periodically actuated by the rotation of the carrier.

25. A paper box machine comprising a carrier having a series of radial arms adapted to receive tubular blanks, rolls, rotatably mounted in said arms, against which the sides of said blanks may bear, rolls mounted in frames movable toward and from the path of said radial arm between which and the rolls on said arms the sides of the blank may be frictionally engaged, and means for driving said frame rolls.

26. In a paper box machine, the combination with a rotatable base, of an arm carried thereby, a form removably secured to said arm and having a series of gage devices, rods pivotally mounted on the arm and having free ends adapted to be engaged by said gaging devices to limit the outward swing of said rods and a roll rotatably mounted between said rods.

27. In a paper box machine, the combination with a base having a pedestal, and anti friction devices movably mounted thereon, of a form removably secured to said pedestal and having means for limiting the outward movement of the anti friction devices.

28. In a paper box machine, the combination with a carrier having a base, arms pivotally mounted thereon, an anti friction roll carried by the arms, and means for securing said arms from movement, of a form removably secured to the pedestal, to the lateral dimensions of which the arms are designed to be adjusted as and for the purpose described.

In testimony whereof I affix my signature in presence of two witnesses.

GEORGE R. WYMAN.

Witnesses:
HENRI E. DAVENPORT,
H. H. MILLER.